(12) United States Patent
Schueler

(10) Patent No.: US 7,874,052 B2
(45) Date of Patent: Jan. 25, 2011

(54) LONGITUDINAL SEAM-STRUCTURE ASSEMBLY OF AIRCRAFT FUSELAGE

(75) Inventor: Harald Schueler, Hamburg (DE)

(73) Assignee: Airbus Deutschland GmbH (DE)

( * ) Notice: Subject to any disclaimer, the term of this patent is extended or adjusted under 35 U.S.C. 154(b) by 1243 days.

(21) Appl. No.: 11/333,467

(22) Filed: Jan. 17, 2006

(65) Prior Publication Data

US 2006/0179637 A1   Aug. 17, 2006

Related U.S. Application Data

(60) Provisional application No. 60/644,951, filed on Jan. 19, 2005.

(30) Foreign Application Priority Data

Jan. 19, 2005   (DE) ...................... 10 2005 002 546

(51) Int. Cl.
  *B25B 27/14* (2006.01)
(52) U.S. Cl. .................. 29/281.5; 29/897.2; 29/243.53; 29/281.6; 29/525.06
(58) Field of Classification Search .............. 29/897.2, 29/524, 524.1, 525.06, 559, 243.53, 281.5, 29/281.6; 227/69, 153
See application file for complete search history.

(56) References Cited

U.S. PATENT DOCUMENTS

| | | | | |
|---|---|---|---|---|
| 2,615,234 A * | 10/1952 | Dumbleton | ................... | 29/462 |
| 2,910,895 A * | 11/1959 | Winslow | ...................... | 408/10 |
| 4,662,556 A | 5/1987 | Gidlund | ........................ | 227/69 |
| 4,850,763 A * | 7/1989 | Jack et al. | ................... | 409/178 |
| 4,858,289 A * | 8/1989 | Speller, Sr. | .................. | 29/34 B |
| 5,468,099 A | 11/1995 | Wheetley et al. | ............ | 408/1 R |
| 5,555,616 A * | 9/1996 | Michalewski et al. | ......... | 29/509 |
| 5,961,258 A * | 10/1999 | Ende et al. | ................... | 408/103 |
| 6,098,260 A | 8/2000 | Sarh | ........................ | 29/243.53 |
| 6,108,896 A * | 8/2000 | Gignac et al. | .............. | 29/524.1 |
| 6,210,084 B1 | 4/2001 | Banks et al. | .................. | 408/97 |
| 6,413,022 B1 * | 7/2002 | Sarh | ............................ | 408/76 |
| 6,729,809 B2 * | 5/2004 | Sarh et al. | ................... | 408/1 R |
| 7,076,856 B2 * | 7/2006 | Sarh | ........................... | 29/524.1 |
| 7,162,789 B2 * | 1/2007 | Day et al. | ................ | 29/525.01 |
| 7,226,253 B2 * | 6/2007 | Otten | ......................... | 408/67 |
| 2003/0068207 A1 * | 4/2003 | Sarh et al. | ................... | 408/1 R |
| 2003/0116331 A1 | 6/2003 | Boyl-Davis et al. | ............ | 173/1 |
| 2003/0221306 A1 * | 12/2003 | Day et al. | ................ | 29/525.01 |

FOREIGN PATENT DOCUMENTS

| DE | 3302618 A1 | 8/1984 |
|---|---|---|
| EP | 0 917 920 A2 | 5/1999 |

\* cited by examiner

*Primary Examiner*—David P Bryant
*Assistant Examiner*—Christopher M Koehler
(74) *Attorney, Agent, or Firm*—Ostrolenk Faber LLP

(57) ABSTRACT

When assembling longitudinal seams, the shells in the region of overlap are moved together over lining-up drill holes, the shells are fastened and subsequently the pilot holes are transferred. Thereafter, these pilot holes are deburred, which involves temporary moving apart of the shells. According to one embodiment of the present invention a rib clamping device is stated that can be used for the longitudinal seam-structure assembly of an aircraft fuselage and that comprises attachment means and fastening means for non-positive and frictionally-engaged fastening of the shells. There is thus no longer any need to temporarily move the components apart.

6 Claims, 5 Drawing Sheets

US 7,874,052 B2

LONGITUDINAL SEAM-STRUCTURE ASSEMBLY OF AIRCRAFT FUSELAGE

REFERENCE TO RELATED APPLICATIONS

This application claims the benefit of the filing date of German Patent Application No. 10 2005 002 546.3 filed Jan. 19, 2005 and of U.S. Provisional Patent Application No. 60/644,951 filed Jan. 19, 2005, the disclosure of which applications is hereby incorporated herein by reference.

FIELD OF THE INVENTION

The present invention relates to the longitudinal seam-structure assembly of aircraft fuselages. In particular, the present invention relates to a rib clamping device for the longitudinal seam-structure assembly of an aircraft fuselage, a method for the longitudinal seam-structure assembly, and the use of a corresponding rib clamping device for the longitudinal seam-structure assembly.

TECHNOLOGICAL BACKGROUND

During longitudinal seam-structure assembly the shells in the region of overlap are moved together over lining-up drill holes and are fastened. Subsequently the pilot drill holes are transferred. After drilling, the shells are moved apart and the burrs are removed from the drill holes. Thereafter sealant is applied and the shells are again moved together and are tacked.

The drill holes are then drilled open to their final dimensions and then countersunk and riveted. This requires considerable labour as a result of the placement of pop rivets and as a result of pilot drilling, drilling the pilot holes open and countersinking.

As an alternative to this manual method of the longitudinal seam-structure assembly a semi-automatic method can be used. In this method the shells, instead of being tacked, are screwed to jigs. On the rails of the drilling jig the so called LBOS-drilling unit (longitudinal-seam drilling system, manually positioned automatic drill feed unit with lubricant metering and suction removal for AL/AL and AL/titanium, with fastening in a drilling jig with rail guide in x and y directions) is installed, and all remaining drill holes are automatically drilled to final dimensions.

Subsequently, the shells are riveted. The provision of drilling jigs and a drilling system requires very considerable expenditure.

SUMMARY OF THE INVENTION

Amongst other things, it may be an object of the present invention to provide an improved longitudinal seam-structure assembly of aircraft fuselages.

According to one embodiment of the present invention the above object may be met by means of a rib clamping device for the longitudinal seam-structure assembly of an aircraft fuselage, wherein the rib clamping device comprises attachment means for attaching the rib clamping device to a first rib of the aircraft fuselage, and fastening means for non-positive and frictionally-engaged fastening of a first shell and a second shell of the aircraft fuselage such that a first group of first drill holes can be produced in the first shell without any stress.

The rib clamping device according to the invention provides an economical assembly system that may make possible longitudinal seam-structure assembly without the need for the first shell and the second shall having to be moved apart for burr removal of the first group of first drill holes. The first and the second shell may be fastened together in such a way that neat first drill holes can be produced, which do not have to be deburred on the insides of the first and the second shell on which insides the first and the second shell rest against each other.

In this way there is no longer a need for any interim disassembly of the components.

According to a further embodiment of the present invention the attachment means comprises a first hydraulic or pneumatic clamping cylinder and a form block, wherein a region of the first rib can be squeezed in by interaction of the first hydraulic or pneumatic clamping cylinder, with the form block, so that the rib clamping device can be attached to the first rib.

Hence, the first hydraulic or pneumatic clamping cylinder may provide a reliable, economical and externally selectable type of attachment of the rib clamping device to the first rib.

According to a further embodiment of the present invention the fastening means comprises a second hydraulic or pneumatic clamping cylinder and a pressure stamp, wherein the pressure stamp can be pressed by the second hydraulic or pneumatic clamping cylinder for fastening the first and the second shell against the first and the second shell, and wherein the first group at first drill holes is transferred using a crack stopper as a jig.

By providing a first and a second clamping cylinder, attachment of the rib clamping device to the first rib and the contact pressure force of the pressure stamp to the first and the second shell can be controlled independently of each other.

According to a further embodiment of the present invention, furthermore the fastening means is designed to fasten an outside drilling jig to the pressure stamp by way of the first group of first drill holes so that then a second group of second drill holes in the first and the second shell can be produced in a region of overlap of the first and the second shell.

By fastening the outside drilling jig, for example in the crack stopper region, drilling without drilling chips is ensured even in hard materials such as for example titanium. Fastening can for example take place by way of screws or rivets.

Furthermore, according to a further embodiment of the present invention, the rib clamping device can be attached to the first rib, and can fasten the first and the second shell in such a way that a non-positive and frictionally engaged connection between the first end of the first rib, the second end of a second rib, the first shell and the second shell is established.

In this way, loose rib ends can quickly and easily be fastened relative to each other and relative to the shells.

According to a further embodiment of the present invention the rib clamping device further comprises a pressure measuring device for measuring the pressure exerted by the rib clamping device on the first and the second shell.

In this way the exerted pressure can be monitored and adjusted accordingly.

According to a further embodiment of the present invention a method for the longitudinal seam-structure assembly of an aircraft fuselage with a rib clamping device is stated. In this method the rib clamping device is attached to a first rib by means of the fastening means, and a first shell is non-positively and in a frictionally-engaged manner fixed to a second shell of the aircraft fuselage with the use of the fastening means. Furthermore, a first group of first drill holes is produced in the first shell.

According to this embodiment of the present invention a quick and easy method is stated in which shells of an aircraft fuselage can be interconnected during assembly without the need to temporarily move them apart during assembly, for example in order to remove burrs from the drill holes.

According to a further embodiment of the present invention sealing means are applied to the first shell and the second shell, and before the rib clamping device is attached, the shells are fastened, by way of one or several lining-up drill holes, in a region of overlap of the first and the second shell. After stress-free production of the first group of first drill holes in the first shell, which is the outer shell, an outside drilling jig is fastened to a pressure stamp of the rib clamping device. The first group of first drill holes is used for this purpose. Furthermore, the method involves the production of a second group of second drill holes in the first and the second shell in the region where the two shells overlap, after which the two shells are riveted together through the second drill holes. In this process, the first group of first drill holes is transferred by means of a crack stopper that is used as a jig.

Further objects, embodiments and advantages of the invention are stated in the subordinate claims and in the secondary independent application claim.

Below, the invention is described in more detail by means of exemplary embodiments with reference to the drawings.

BRIEF DESCRIPTION OF THE DRAWINGS

In the drawings.

In the following description of the figures, the same reference characters are used for identical or similar elements.

DESCRIPTION OF PREFERRED EMBODIMENTS OF THE INVENTION

Figure 1:
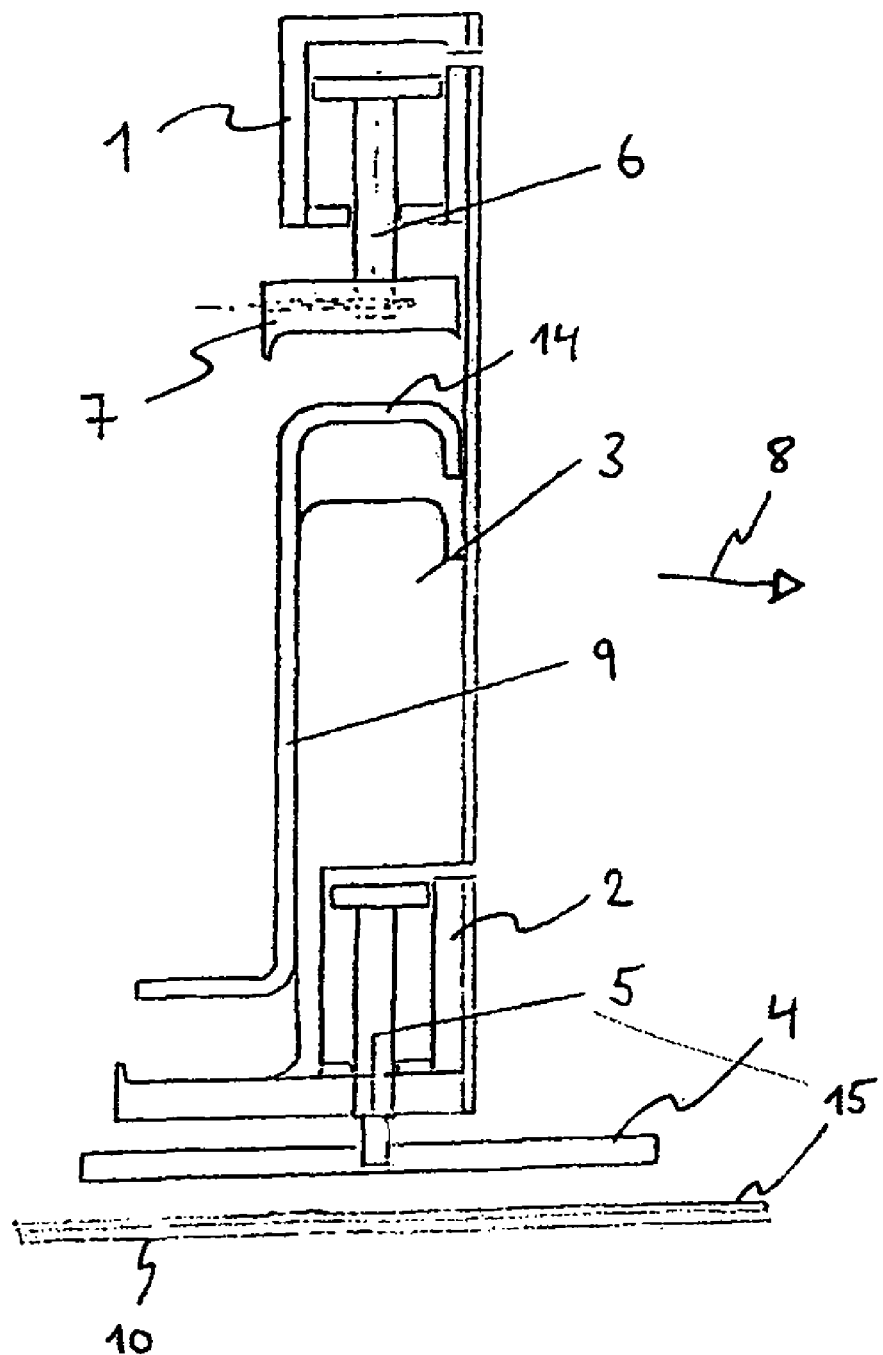
FIG. 1 shows a diagrammatic cross-sectional view of a rib clamping device along a first sectional plane according to one embodiment of the present invention.

FIG. 1 is a diagrammatic cross-sectional view of a rib clamping device for longitudinal seam-structure assembly of an aircraft fuselage along a first sectional plane according to one embodiment of the present invention. As shown in FIG. 1 the rib clamping device comprises a top clamping cylinder 1, a bottom clamping cylinder 2 and a form block 3. The new rib clamping system is an economical assembly system in which temporary disassembly or temporary moving apart of the shells to be installed is no longer necessary.

The longitudinal axis of the aircraft is indicated by reference character 8.

The top clamping cylinder 1 and the form block 3 are used to squeeze the rib 9 in a top region 14, thus attaching the rib clamping device to the top region 14 of the rib 9. The bottom clamping cylinder 2 is connected to an inner pressure stamp 4, which for the purpose of fastening a first shell 10 and a second shell 15 can be pressed against the first shell 10 and the second shell 15. In this way the first shell 10, the second shell 15 and the rib 9 can be fastened so as to be non-positively and frictionally engaged so that a first group of first drill holes in the first shell 10 can be produced without any stress. The first group of first drill holes is for example transferred from a crack stopper that is used as a drilling jig (i.e. it already comprises drilling jig holes in titanium).

The top clamping cylinder 1 comprises a top piston 6 to which a clamping stamp 7 is attached. By activating the clamping cylinder, the clamping stamp 7 is pushed against the top region 14 of the rib 9, and the form block 3 moves in the direction of the clamping stamp 7 until a non-positive and secure attachment of the rib clamping device to the top region 14 of the rib 9 has been achieved.

The bottom clamping cylinder 2 comprises a bottom piston 5 to which the inner pressure stamp 4 is attached. If the bottom clamping cylinder 2 is activated, the bottom piston 5 slides the inner pressure stamp 4 against the two shells, thus fastening them non-positively and in a frictionally engaged manner so that, subsequently, corresponding drill holes can be made without drilling chips finding their way into the gap between the two shells. There is thus no need for subsequent burr removal.

Figure 2:
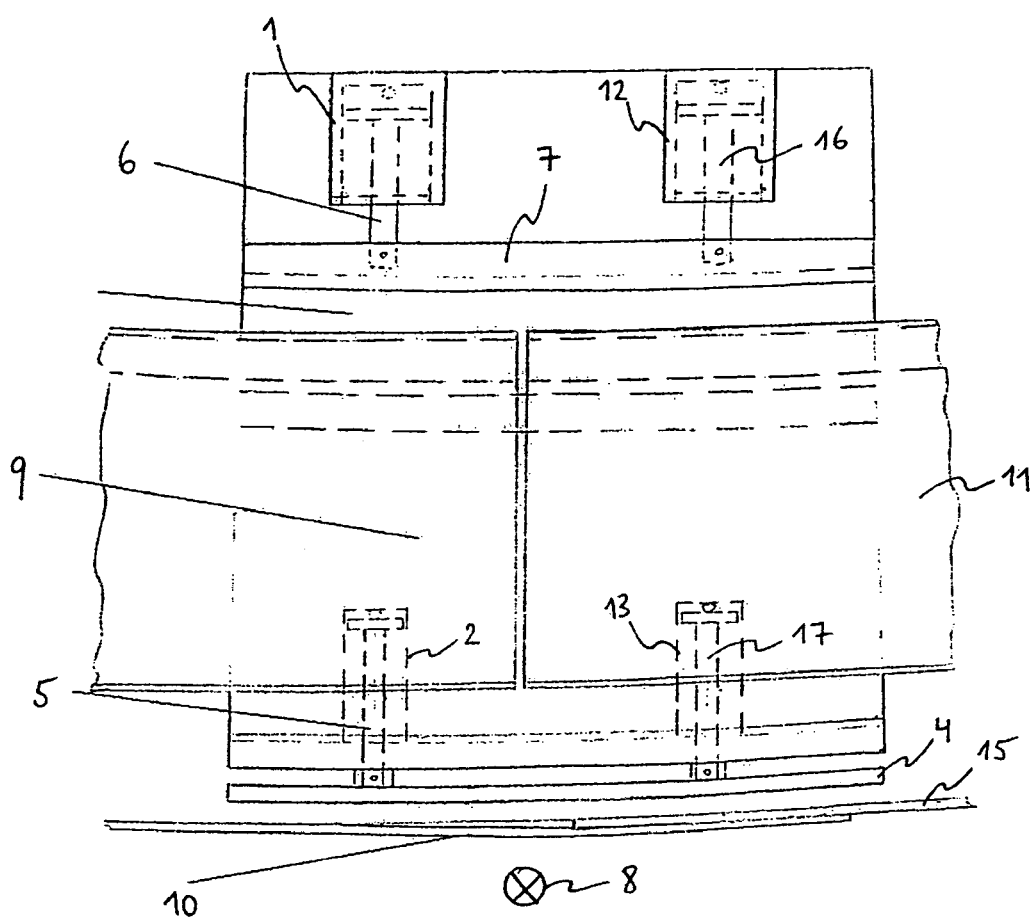
FIG. 2 shows a further diagrammatic cross-sectional view of a rib clamping device along a second sectional plane according to one embodiment of the present invention.

FIG. 2 shows a further diagrammatic cross-sectional view of a rib clamping device along a second sectional plane according to one embodiment of the present invention. The rib clamping device shown in FIG. 2 comprises a further top clamping cylinder 12 with a corresponding piston 16 and a further bottom clamping cylinder 13 with a corresponding bottom piston 17. The second top piston 16 is connected to the clamping stamp 7, and the bottom piston 17 is connected to the inner pressure stamp 4. The rib clamping device shown in FIG. 2 can for example be attached to two adjacent rib ends 9, 11 so that the two rib ends 9, 11 are firmly fastened to each other.

In FIG. 2 the longitudinal axis of the aircraft is indicated by reference character 8, and extends vertically in relation to the image plane.

By attaching the rib clamping device to the rib ends 9, 11, and by fastening (in a non-positive and frictionally-engaged manner), by means of the inner pressure stamp 4, the first shell 10 and the second shell 15, the first group of first drill holes can then be produced in the first shell 10 without any stress, from the inside, by using the crack stopper as a drilling jig. Furthermore, precise fitting and stable fastening of the two shells 10, 15 relative to each other and relative to the two rib ends 9, 11 is ensured.

The crack stopper is for example a geometrically formed double trapezoidal titanium sheet, approximately 1 mm in thickness, which is designed to prevent a crack that has developed from growing.

In the new longitudinal seam assembly the two shells 10, 15 will be provided with sealing means and in the region of overlap are moved together and fastened by way of lining-up drill holes. The rib clamping devices are then moved over the loose rib ends 9, 11, and compressed air is applied to the clamping cylinders 1, 2, 12, 13 so as to activate them. Moving apart the cylinders results in a non-positive and frictionally-engaged connection between the loose rib ends 9, 11 of the shells and the skin field with the crack stopper. It is then possible, from the inside, to transfer several (first) drill holes in the crack stopper to the outside skin field (namely the first outer shell 10) without any drilling chips and without any stress, for example with the use of a sleeve drill. By way of these drill holes (of which there are for example four) an outside drilling jig (not shown in FIG. 2) can be screwed together or otherwise connected to the inner pressure stamp 4. A non-positive connection between the outside drilling rig and the inner pressure stamp in the region of the crack stopper ensures drilling in titanium without producing any drilling chips. It is then possible to produce a second group of second drill holes in the first and the second shell 10, 15 in the region of overlap of the two shells 10, 15 either manually or for example with an automatic drilling system, such as a so-called drill feed unit, to their final dimensions.

With the rib clamping device according to the invention it is thus possible to produce close-tolerance drill holes, free of any drilling chips, in aluminium and in titanium, even in the region of the crack stopper.

Thereafter the shells can be riveted together.

Figure 3:
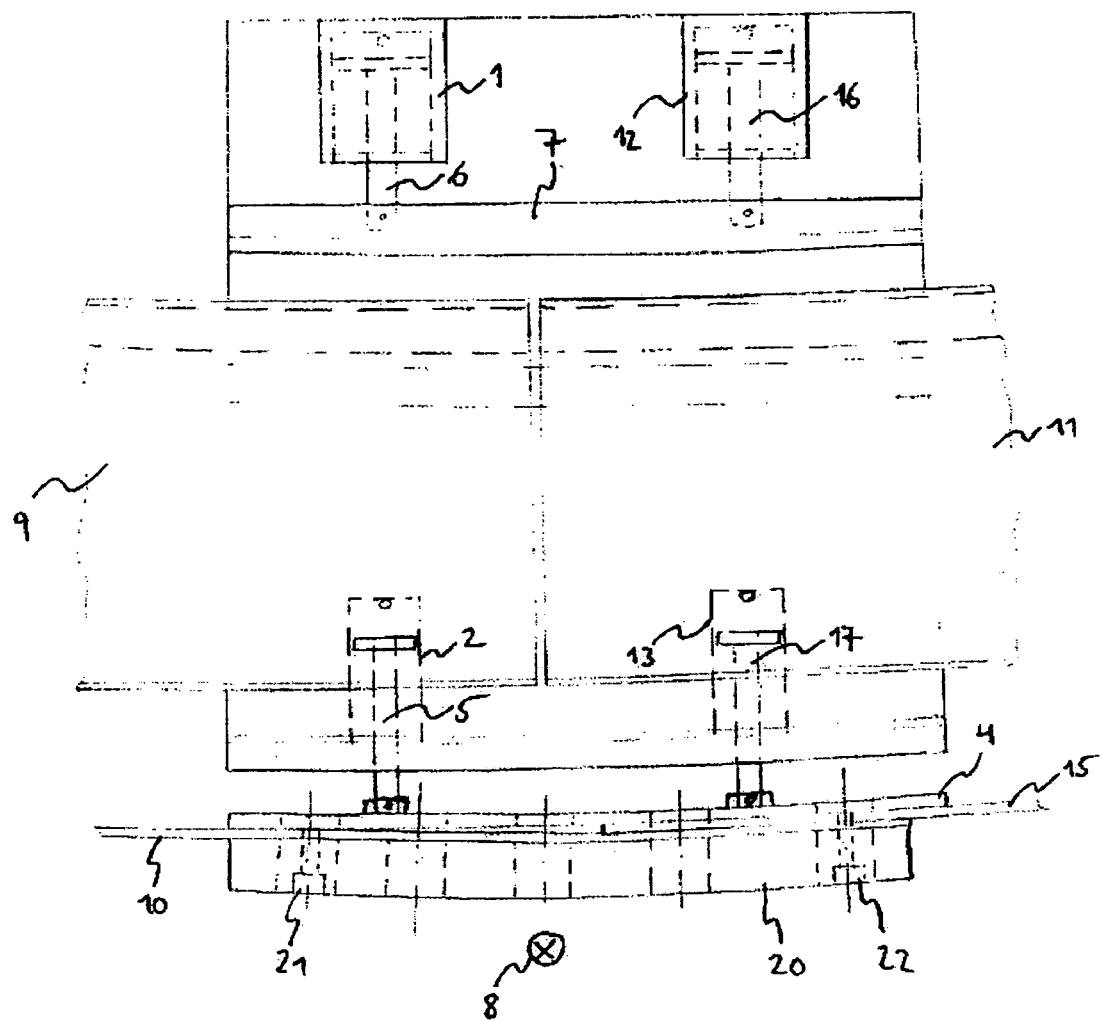
FIG. 3 shows a diagrammatic illustration of the rib clamping device of FIG. 2, with an outside drilling rig and crack stopper screw connections.

FIG. 3 is a diagrammatic illustration of the rib clamping device of FIG. 2, with an outside drilling rig 20 and crack stopper screw connections 21, 22.

It is thus possible to produce close-tolerance drill holes to final dimensions, without any drilling chips, in aluminium and hard materials, such as for example titanium, with the least possible device expenditure. In order to prevent any impurities as a result of drilling (such as drilling chips or lubricant or the like) finding their way onto the contact surfaces between the first shell 10 and the second shell 15 in the region of overlap, the two shells are for example screwed or riveted to the inner pressure stamp 4 by way of an outside drilling jig 20. In this way it is possible to use increased drilling forces of 250 Newton or more without there being any relative movement between the components.

Furthermore, a pressure measuring device (not shown in FIG. 2) for measuring the pressure exerted by the rib clamping device on the first and the second shell 10, 15 can be provided. In particular, this pressure measuring device can be connected to a control- or regulating device which controls or regulates the clamping cylinders 1, 2, 12, 13. It is thus for example possible to ensure that a specified contact pressure always acts on the rib region 14, and in particular on the shells 10, 15.

Furthermore, it should be noted that the squeezing device (comprising the top clamping cylinder 1, the top piston 6 and the clamping stamp 7) does not have to be in the form of a hydraulic or pneumatic clamping cylinder; instead it can be designed as a pneumatic device or a purely mechanical device that for example comprises a thread that can be operated by an electric motor or that can be operated manually. The same applies to the remaining clamping cylinders and the associated pistons, clamping stamps and pressure stamps.

Figure 4:
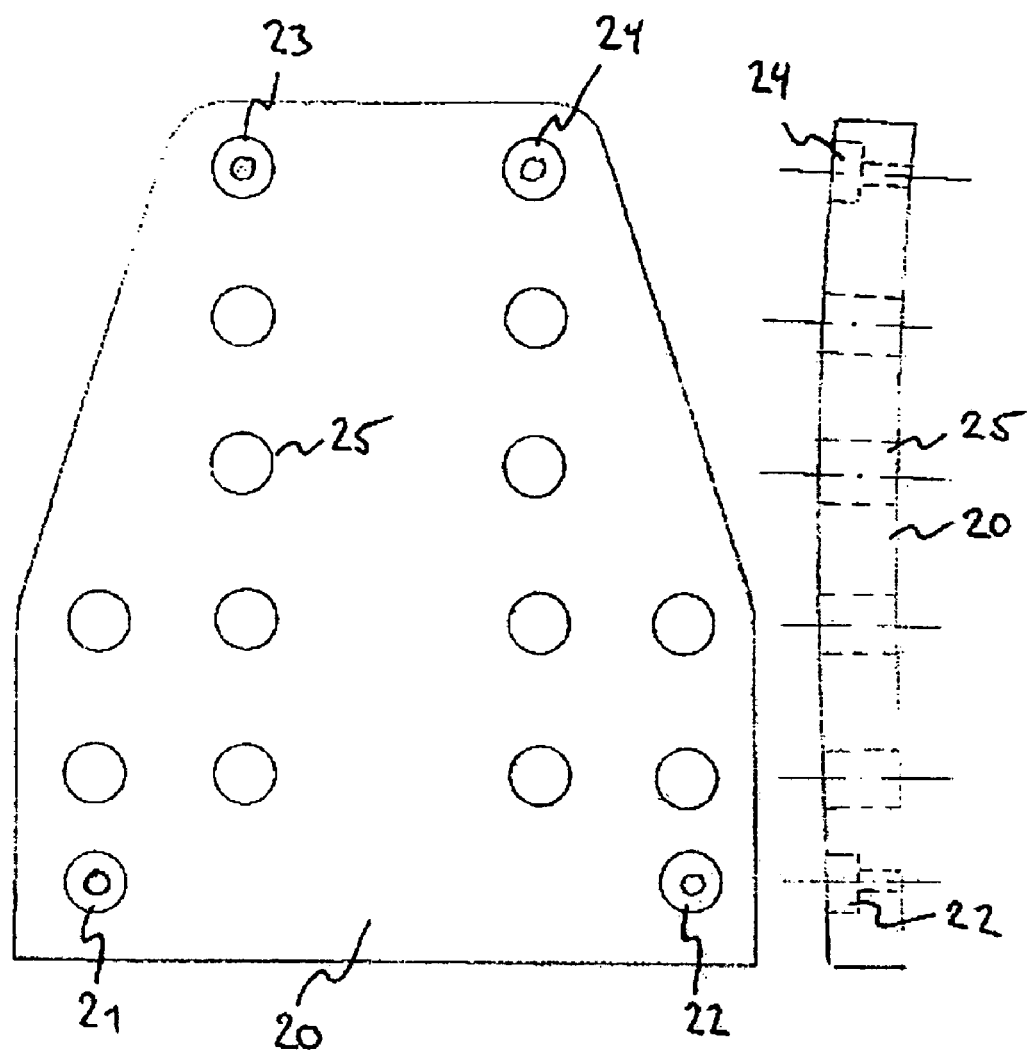
FIG. 4 shows a diagrammatic illustration of the outside drilling jig of FIG. 3, according to one embodiment of the present invention.

FIG. 4 is a diagrammatic illustration of the outside drilling jig 20 of FIG. 3, comprising first drill holes 21, 22, 23, 24 and second drill holes (such as for example drill hole 25) according to one embodiment of the present invention. A top view and a lateral view of the outside drilling jig 20 is shown.

Figure 5:
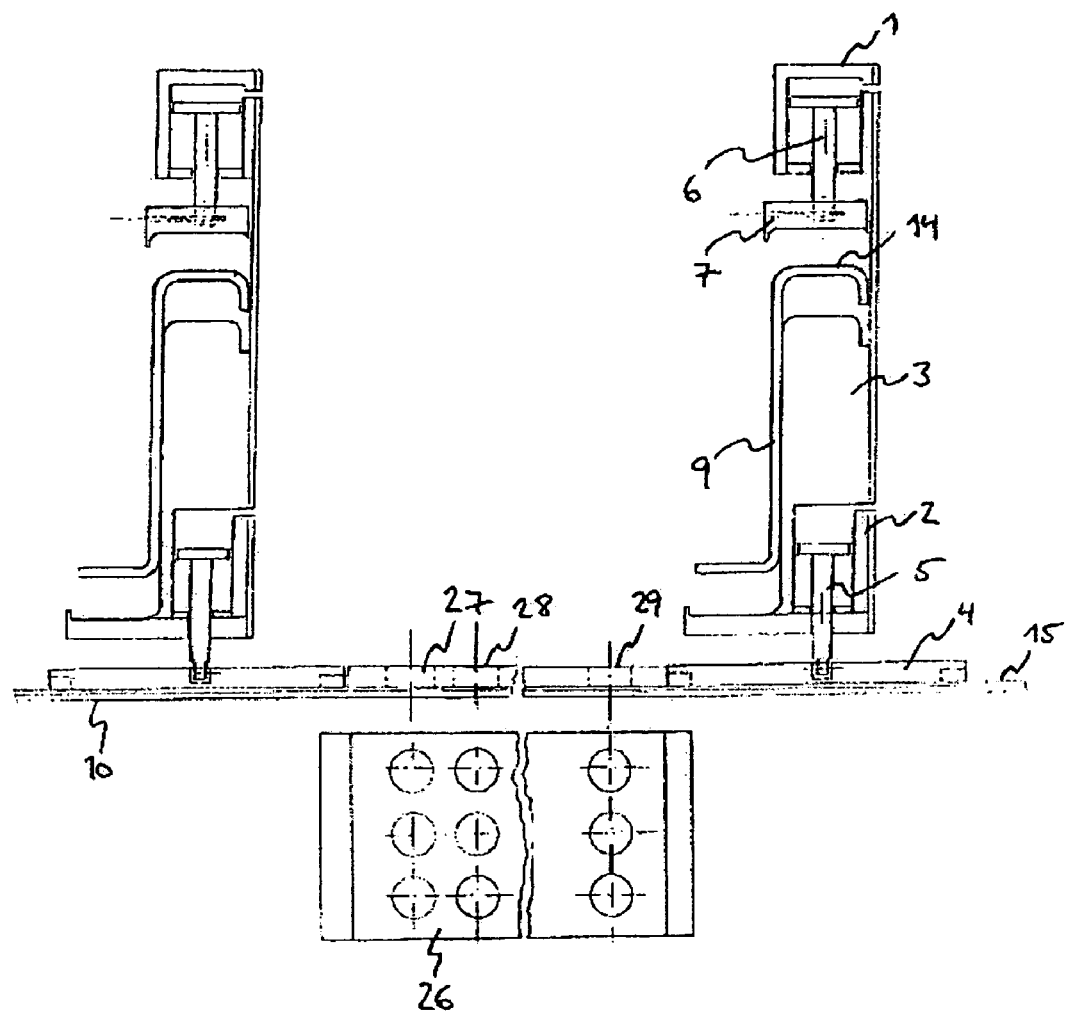
FIG. 5 shows a diagrammatic illustration of the regions of the longitudinal seam between the ribs.

FIG. 5 is a diagrammatic illustration, according to a preferred embodiment of the present invention, of the regions of the longitudinal seam between the ribs.

The regions of the longitudinal seam aluminium/aluminium between the ribs can be fastened to the rib clamping device with the use of a simple inner jig so as to support the region of overlap and a stringer. Likewise, without the inner jig the aluminium/aluminium regions can be fastened to the stringer only by way of several lining-up drill holes 27, 28, 29. For example, a simple sheet metal jig 26 can be screwed on from the outside by way of these drill holes.

Implementation of the invention is not limited to the preferred embodiments shown in the figure. Instead, a multitude of designs are imaginable which use the solution shown and the principle according to the invention even in the case of fundamentally different embodiments.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

What is claimed is:

1. A rib clamping device for longitudinal seam-structure assembly of an aircraft fuselage, wherein the rib clamping device comprises:
    attachment means for attaching the rib clamping device to a first rib of the aircraft fuselage;
    fastening means for non-positive and frictionally-engaged fastening of a first shell and a second shell of the aircraft fuselage such that a first group of first drill holes can be produced in the first shell without any stress;
    wherein the attachment means comprises a first hydraulic or pneumatic clamping cylinder and a form block; and
    wherein a region of the first rib is squeezed in between the first hydraulic or pneumatic clamping cylinder and the form block by interaction of the first hydraulic or pneumatic clamping cylinder with the form block, such that both the first hydraulic or pneumatic element and the form block directly contact the region of the first rib and so that the rib clamping device is attached to the first rib.

2. The rib clamping device of claim 1,
    wherein the fastening means comprises a second hydraulic or pneumatic clamping cylinder and a pressure stamp;
    wherein the pressure stamp can be pressed by the second hydraulic or pneumatic clamping cylinder for fastening the first and the second shell to each other; and
    wherein the first group of first drill holes is transferred using a crack stopper as a jig.

3. The rib clamping device of claim 1, wherein furthermore the fastening means is designed to fasten an outside drilling jig to a pressure stamp by way of the first group of first drill holes so that then a second group of second drill holes in the first and the second shell can be produced in a region of overlap of the first and the second shell.

4. The rib clamping device of claim 1, wherein by attaching the rib clamping device and fastening the first and the second shell a non-positive and frictionally-engaged connection between the first end of the first rib, the second end of a second rib, the first shell and the second shell is established.

5. The rib clamping device of claim 1, further comprising a pressure measuring device for measuring the pressure exerted by the rib clamping device on the first and the second shell.

6. The use of a rib clamping device of claim 1 for the longitudinal seam-structure assembly of an aircraft fuselage.

* * * * *